United States Patent
Grischy et al.

(10) Patent No.: US 10,440,595 B2
(45) Date of Patent: *Oct. 8, 2019

(54) WIRELESS LOCAL AREA NETWORK COVERAGE HOLE DETECTION USING MOBILE COMMUNICATION DEVICES

(71) Applicant: SYMBOL TECHNOLOGIES, LLC, Lincolnshire, IL (US)

(72) Inventors: Michael Grischy, San Jose, CA (US); Puneet Batta, San Jose, CA (US); Jacob Thomas, Santa Clara, CA (US); Sundaresan Sundaram, Bangalore (IN); Sandeep Ramakrishnan, Bangalore (IN); V. Sethuraman, Madurai (IN); Jeevan Kukkalli, Bangalore (IN); Rajendiran Subramani, Bangalore (IN)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,425

(22) Filed: Jan. 29, 2018

(65) Prior Publication Data

US 2018/0167830 A1 Jun. 14, 2018

Related U.S. Application Data

(63) Continuation of application No. 14/804,954, filed on Jul. 21, 2015, now Pat. No. 9,913,154.

(51) Int. Cl.
*H04W 24/04* (2009.01)
*H04W 24/10* (2009.01)
*H04W 84/12* (2009.01)
*H04W 16/18* (2009.01)
*H04W 64/00* (2009.01)

(52) U.S. Cl.
CPC .......... *H04W 24/04* (2013.01); *H04W 24/10* (2013.01); *H04W 16/18* (2013.01); *H04W 64/00* (2013.01); *H04W 84/12* (2013.01)

(58) Field of Classification Search
CPC ...... H04L 49/253; H04W 76/18; H04W 84/12
See application file for complete search history.

(56) References Cited

U.S. PATENT DOCUMENTS

| | | |
|---|---|---|
| 2006/0128371 A1 | 6/2006 | Dillon et al. |
| 2007/0268879 A1 | 11/2007 | Baumann et al. |
| 2007/0280152 A1 | 12/2007 | Thomson et al. |
| 2008/0032727 A1 | 2/2008 | Stephenson et al. |

(Continued)

*Primary Examiner* — Melanie Jagannathan

(57) ABSTRACT

Apparatus and method for coverage hole detection in a wireless local area network (WLAN) using a mobile communication device. The method includes a first step of providing a plurality of access points distributed within the WLAN and at least one mobile communication device operable within the WLAN. A next step includes downloading triggers for respective coverage measurement conditions to the at least one associated mobile communication device from an associated access point. A next step includes detecting a coverage measurement condition by the at least one mobile communication device that activates one of the triggers, whereupon a next step includes sending a coverage measurement indicating the triggered condition from the at least one mobile communication device to an associated access point, which forwards a coverage incident report to a Central Report Manager.

17 Claims, 3 Drawing Sheets

(56) References Cited

U.S. PATENT DOCUMENTS

| | | |
|---|---|---|
| 2010/0190488 A1 | 7/2010 | Jung et al. |
| 2011/0130135 A1 | 6/2011 | Trigui |
| 2011/0201364 A1 | 8/2011 | Capuozzo et al. |
| 2012/0127876 A1 | 5/2012 | Hunukumbure et al. |
| 2012/0220291 A1 | 8/2012 | Olsson et al. |
| 2013/0040659 A1 | 2/2013 | Van Der Velde et al. |
| 2013/0196650 A1 | 8/2013 | Futaki |
| 2015/0052255 A1 | 2/2015 | Sun et al. |
| 2015/0341939 A1 | 11/2015 | Sharma et al. |
| 2016/0285679 A1 | 9/2016 | Dudda et al. | ns # WIRELESS LOCAL AREA NETWORK COVERAGE HOLE DETECTION USING MOBILE COMMUNICATION DEVICES

BACKGROUND

Wireless local area network (WLAN) solutions have been introduced that deploy low-range radio frequency access points at known, mapped locations within confined premises, such as the floors of a business enterprise for example. Such access points periodically broadcast a beacon used to connect with mobile communication devices moving within the premises. A mobile communication device moving within the premises, and having the ability to receive the beacon and read the identity of any one (i.e. the strongest signaled) of such access points, can associate with that access point. Ideally, as the mobile communication device moves within the premises it should always be able to connect reliably to at least one access point in the WLAN.

However, a problem arises from structural and object placement, structural and object materials, and difficult access point locations, resulting in WLAN coverage holes within the premises where a moving mobile communication device may find itself unable to reliably connect to the WLAN.

Traditionally such holes are detect during the initial installation of the WLAN in a site survey by having someone traverse the area with specialized measuring equipment, noting where such holes occur, so that access points can be moved or more access points can be installed to eliminate coverage holes. This type of analysis is time consuming and tedious, and does not account for any later changes made to the premises. In addition, a site survey cannot always anticipate actual operating conditions, which can lead to areas of poor wireless coverage.

Hence, there is a need for a technique to alleviate the above issues in coverage hole detection in a WLAN. In particular, it is desirable to measure and locate coverage holes in a WLAN without using any specialized equipment, in real-time, while being dynamically adaptable.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
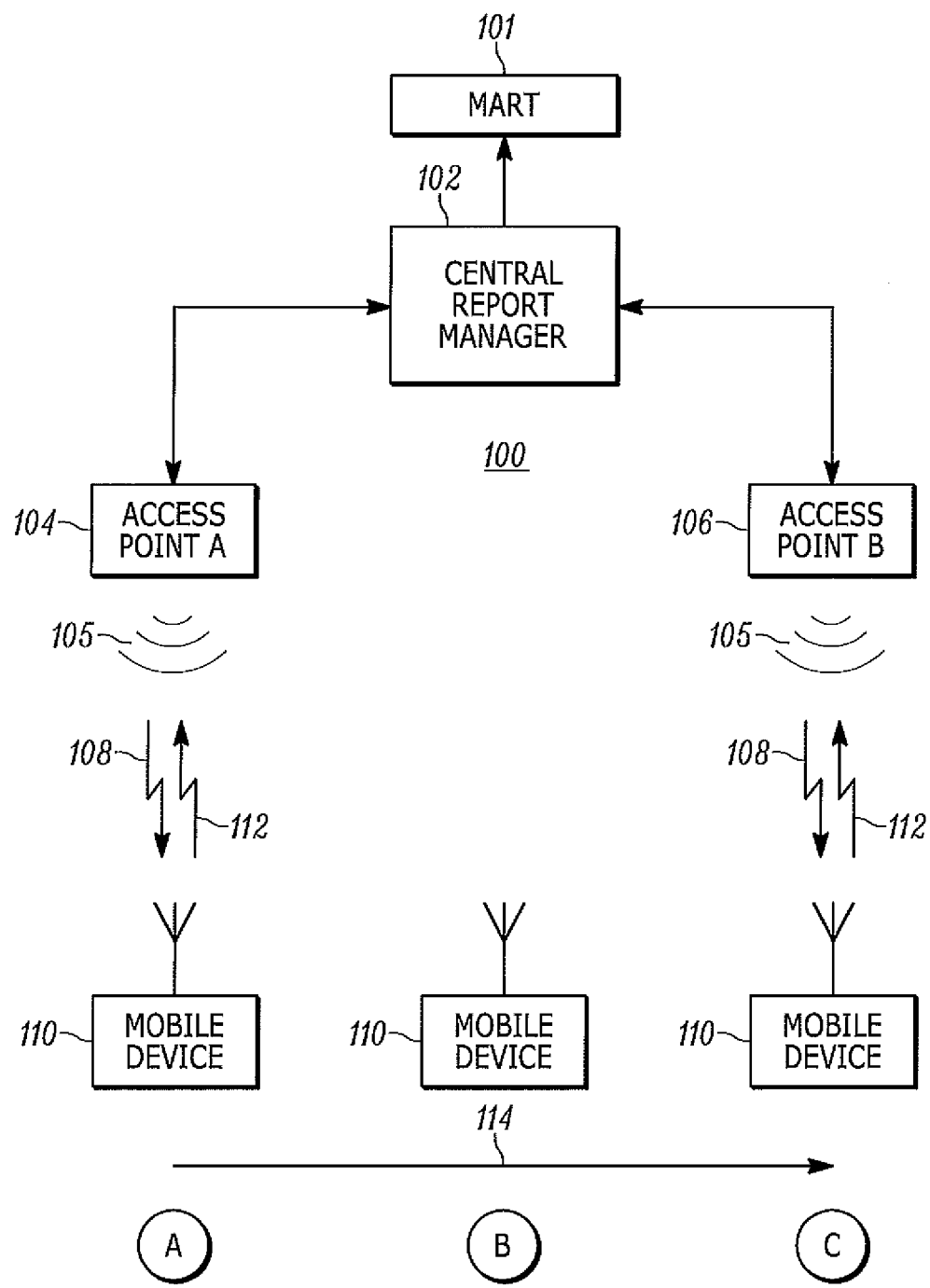
FIG. 1 is a simplified block diagram of a WLAN, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a technique to detect coverage holes (i.e. areas of poor coverage) in a wireless local area network. In particular, coverage hole detection helps determine whether mobile communication devices are experiencing unexpected coverage holes, where those coverage holes are located, what is causing the coverage hole, and when a mobile communication device experiences a coverage hole, why it hasn't already roamed to another access point.

In an exemplary embodiment, such as shown in FIG. 1, the present invention utilizes radio frequency and associated protocols. In particular, the present invention provides a system with connectivity to a wireless local area network hereafter referred to as WLAN 100. WLAN can be based on various protocols including but not limited to IEEE 802.11. The present invention, in the examples described herein, implements novel coverage hole detection extensions to (Institute of Electrical and Electronics Engineers) IEEE 802.11k messages and behaviors, and is operable with mobile communication devices that can communicate using these extensions, and in a limited way with other mobile communication devices under particular circumstances. However, the description that follows can apply to an access network that is IEEE 802.xx-based, employing wireless technologies such as RF, IrDA (infrared), Bluetooth, ZigBee (and other variants of the IEEE 802.15 protocol), IEEE 802.11 (any variation), IEEE 802.16 (WiMAX or any other variation), IEEE 802.20, Direct Sequence Spread Spectrum; Frequency Hopping Spread Spectrum; cellular/wireless/cordless telecommunication protocols not limited to GSM, CDMA, TDMA, GPRS, EDGE, LTE, UMTS, etc.; wireless home network communication protocols; wireless hospital or health care facility network protocols such as those operating in the WMTS bands; GPRS; and proprietary wireless data communication protocols such as variants of Wireless USB, any of which can be modified to implement the embodiments of the present invention.

Those skilled in the art will recognize that FIG. 1 does not depict all of the equipment necessary for system to operate but only those system components and logical entities particularly relevant to the description of embodiments herein. Each of the devices shown in the figures are known to also comprise basic interconnected components such as, but not limited to, radios, transceivers, antennas, keypads, speakers, microphones, displays, memories, interfaces and processors, such as microprocessors, microcontrollers, digital signal processors, application-specific integrated circuits, field programmable gate arrays, and/or logic circuitry. Such components are typically adapted to implement algorithms and/or protocols that have been expressed using high-level design languages or descriptions, expressed using computer instructions, expressed using messaging logic flow diagrams. Thus, given an algorithm, a logic flow, a messaging/signaling flow, and/or a protocol specification, those skilled in the art are aware of the many design and development techniques available to implement a processor that performs the given logic.

Therefore, each network entity and mobile device represents a known apparatus that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the present invention may be implemented in any of the devices listed above or distributed across such components. It is within the contemplation of the invention that the operating requirements of the present invention can be implemented in firmware or hardware, with the function being implemented in a software processor (or a digital signal processor) being merely a preferred option in conjunction with the firmware or hardware.

Definitions

Central Report Manager—a component on the RF domain controller that receives Incident Reports from access points (APs) and that logs them to the Incident Report Database.

Client-Assisted Diagnostics—a method of identifying potential AP infrastructure deployment problems whereby mobile communication devices or units (MUs) send diagnostic information to APs when the MUs experience problems.

Coverage Hole—an incident in which the MU experiences an area of poor wireless coverage that was not predicted by a site survey.

Coverage Hole Detection (CHD)—a form of Client-Assisted Diagnostics in which an MU sends diagnostic information to its AP when the MU detects conditions on the air interface that indicate a possible coverage problem.

Coverage Incident—an occurrence of an MU experiencing a coverage hole.

Coverage Incident Report—an Incident Report that represents a Coverage Hole event. Sent by an AP to the Central Report Manager.

Coverage Measurement Report—a collection of diagnostic measurements made by an MU and sent to its AP when it detects a Coverage Measurement Trigger.

Coverage Measurement Triggers—a collection of triggers for respective coverage measurement conditions, configured into an MU by its AP, specifying the conditions under which the MU should perform diagnostic measurements as measured against the triggers and then send to its associated AP a Coverage Measurement Report if a trigger is activated.

Coverage Incident Report Database—a database that stores Coverage Incident Reports. This will be implemented by the MART Database.

MART—(Monitoring, Analytics, Reporting, Troubleshooting) a new infrastructure component that takes data from the MART Database and renders it visually. This includes displaying events and statistics correlated to a Site Floor Plan.

MART Database—a database that stores the statistics, events, alarms, etc. of the coverage incidents that can be displayed using MART.

Site Floor Plan—a floor plan or map for a site showing the placement of all of the APs indicating locations of coverage holes.

FIG. 1 represents a basic embodiment of a system architecture with wireless local area network (WLAN) 100 connectivity. The WLAN 100 is operable to provide communications between at least one mobile communication device 110 and a central server or WLAN manager 102 via any one of plurality of access points (APs) 104, 106. The network can include other entities (not shown) as are known in the art to provide connectivity and communication services to multiple mobile devices. In one embodiment, the WLAN system is operable within a business, retail store or shopping mall for example, and uses the WLAN to communicate with mobile client communication devices or units (MUs) operating within the confines of the premises. In particular, an MU can receive communications 108 from APs 104, 106, and send communications back to the APs. As the MU roams 114 within the premises from location A to location C, its communications can be handed off from one fixed access point A 104 to another fixed access point B 106. However, the MU 110 may encounter locations (B) where it cannot communicate reliably to any AP, i.e. a coverage hole. The present invention serves to detect such coverage holes in real time using the communication signals 108, 112.

Figure 2:
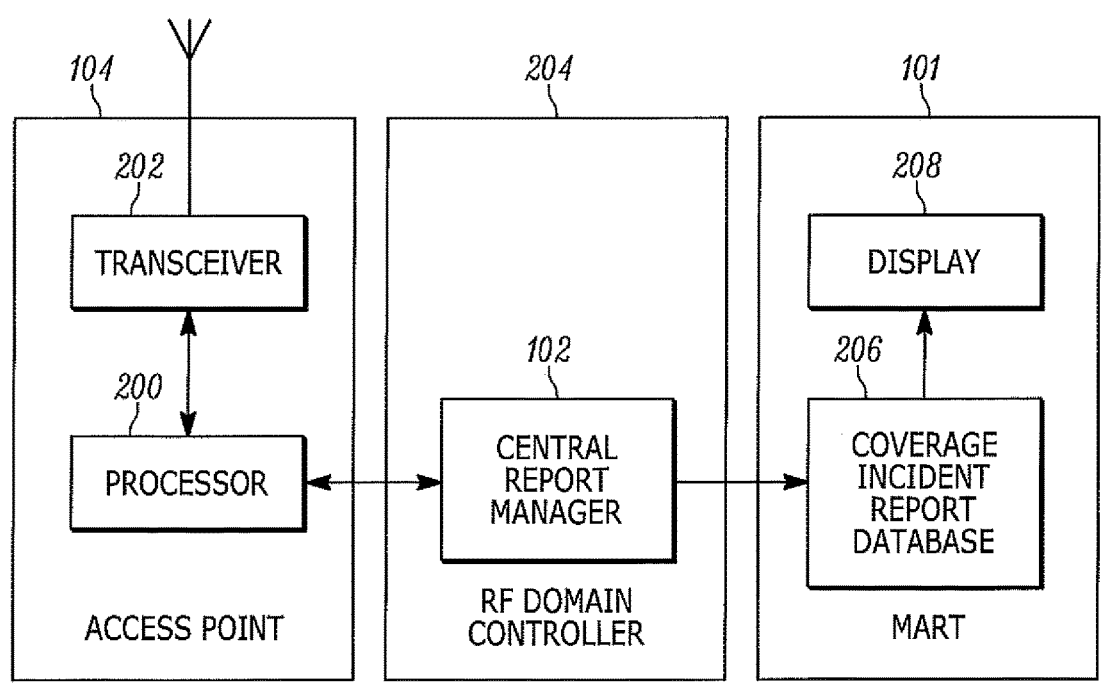
FIG. 2 is a block diagram providing further details of FIG. 1.

Referring to FIG. 2, in the examples described herein, each access point (104 for example) includes a processor 200 and transceiver 202 used for communicating with the mobile units. The MU can send any coverage incident reports it has to its associated AP, which can then transfer coverage incident reports to a central report manager 102 of the RF Domain Controller 204. The MART 101 compiles these coverage incident reports in a coverage incident report database 206, which can then derive a site floor plan of its compiled data of APs and coverage holes to be shown on a display 208.

The WLAN provides a plurality of APs distributed at fixed points within the WLAN. The APs are operable to provide local communications for mobile communication devices (MU) operable within the WLAN premises. When an MU enters the premises, it can attempt to associate with an AP using IEEE 802.11 protocols. The associated AP and MU then negotiate support for coverage hole detection (CHD), wherein the MU and associated AP advertise their support for CHD. In particular, the MU can include an information element in association request frames that specify support for CHD. In addition, the MUs include an information element in a management frame indicating support for IEEE 802.11k protocols. In this way, MUs operating within the WLAN can be CHD-capable, IEEE 802.11k-only CHD-capable (if they support the necessary 802.11k features), or CHD-incapable. During negotiation, the MU indicates to the AP whether it is CHD-capable or 802.11k-only CHD-capable. Preferably, the present invention is directed to CHD-capable MUs. However, IEEE 802.11k-only CHD-capable MUs can be utilized in the present invention to a limited extent.

Referring back to FIG. 1, in practice, those communications between the AP (e.g. 104) and associated MU 110 in accordance with the present invention are based on IEEE 802.11k radio management action frames, comprising measurement request action frames 108 sent from the AP, and measurement report action frames 112 sent from the MU. The AP sends to the MU specific infinitely-repeating measurement requests with "conditional reporting", whereupon the MU measures a signal 105, e.g. a Received Channel Power Indicator (RCPI) measurements of the beacon management frame over and over until a CHD condition is triggered. It should be noted that the trigger can involve measuring a signal 105 of not only beacons but other types of frames. The triggers can cover measurement conditions for both received and transmitted frames, for both management and data frames, and for both broadcast and unicast frames. When the condition is triggered, the MU sends a coverage measurement report to the AP. The set of IEEE 802.11k messages used in the present invention differs between 11k-only-capable and fully-CHD-capable MUs, as will be detailed below.

To avoid coverage incident reports that do not have relevant information, the present invention only wants to know when an MU experiences poor coverage, but only after having been in good coverage first. This eliminates irrelevant reports from an MU before it even comes into range of any AP of the WLAN. Further, after an MU has fallen out of adequate coverage and has sent a report, the present invention does not care about the MUs coverage conditions until it comes back into adequate coverage again. This eliminates irrelevant reports the MU might otherwise send while it wanders around outside of adequate coverage. The MU is instructed to wait until it comes back into adequate coverage before starting to monitor for poor coverage conditions again. Advantageously, the present invention disturbs the MU's normal operation as little as possible, particularly roaming operation, and only asks the MU to monitor conditions that it already normally monitors. When a coverage incident occurs, the present invention only asks for information that the MU already has, and specifically does not ask for off-channel measurements. In this way, there is no extra battery drain on the MU.

For fully-CHD-capable MUs, the present invention maximizes the chance that a coverage incident report will be received successfully by instructing the MU to wait until it comes back into good coverage before attempting to send a coverage incident report. The MU is required to send an entire coverage measurement report in a single frame, wherein if the report is received a Layer-3 ACK(nowledgement) from the AP notifies the MU that report was properly received. If no ACK is received by the MU, the MU can retry sending the message. It is expected that the MU will implement some kind of frame retry backoff. For example, if the MU does not receive a layer-3 ACK from the AP in response to a sent report, the MU shall retry sending the report until a layer-3 ACK is received. The MU should schedule these retries so that they do not consume too much bandwidth. A reasonable algorithm would be to try sending the report again once every 1, 2, 4, 8, 16, 32 seconds, with the 32-second backoff repeated indefinitely until a layer-3 ACK is received. In order to eliminate false positive measurements, the MU can be instructed to average the RCPI of beacons over one second instead of using instantaneous RCPI.

Notes on the desired behavior of CHD-capable MUs: The MU shouldn't start any requested measurements until after it has sent a layer-3 ACK. The MU shouldn't continue with repeated measurements until after it has sent the corresponding report and received a layer-3 ACK for it. If the MU roams to a CHD-incapable AP, the MU should continue to save the "saved report" until the MU becomes connected to a CHD-capable AP. The MU should perform all of the measurement requests specified in Measurement Request 2 before sending a report. The MU should send only a single (not multiple) report frame with the results of Measurement Request 2. The MU should average the RCPI of all beacons received over the duration called out in the triggering request. The RM CHD Instructions subelement will be present and its Use Average bit will be set when the MU should do this. When the MU receives a measurement request IE in which the RM CHD Instructions subelement is present and in which the Blocking Request bit is set, the MU should repeat this single measurement IE over and over until its reporting condition is satisfied and only then move on to the next IE in the measurement request. Ideally, the MU should not actually "perform" any measurements in order to implement the triggering request from the AP. The request is engineered in such a way that the MU can just do what it usually does but also keep track of the RCPI from its serving AP (which it already does for the purposes or roaming) and compare it against the threshold in the triggering request. Specifically, the MU shouldn't let the measurement request interfere with normal roaming, or with putting the radio in power save, or with suspending the device. The MU should operate as if it hasn't received any measurement request at all, until it detects that the RCPI from the serving MU has exceeded the specified threshold. The MU should never send a "refused" or "incapable" report in response to any of the triggering requests from the AP. If the MU doesn't want to honor a request, it should keep silent. When the circumstances at the MU change so that the MU can honor the triggering request, it should just start honoring the request. There is no need to tell the AP anything. Specifically, don't "refuse" a request because the DTIM is approaching or because the MU is in a voice call or because Tx traffic is high. The MU should account for "lost AP" and "missed beacon percent" somehow with respect to the triggering request. The MU could do something like using an RCPI value of −80 dBm for each beacon management frame that it can't hear and then averaging these values in with the rest of the beacons that it can hear.

For CHD-capable MUs: If MU 110 experiences a coverage incident but cannot successfully send a measurement report to its access point A 104 before it becomes disconnected or roams (e.g. 114 from position A to position B), then the MU saves the measurement report (a "saved report"). When the MU roams to a new access point (e.g. AP B 106 in position C) or becomes reconnected again to the old access point A (104 in position A), it sends the saved report as part of a measurement report 112. Since the new access point B may not be the same as the old access point A, the saved report includes the AP Identity (e.g. a Media Access Control address) from the access point A whose signal 105 was measured.

In operation, the MU listens for management frames (e.g. beacons) from the APs. Each beacon carries unique identity information for each AP. The mobile device can determine which AP has the strongest signal, and associates with that AP. The MU can also keep a list of other APs it has detected in a beacon table. The mobile device can send the beacon measurement and identity information extracted from the relevant beacon in the measurement report to the AP. The MU can optionally include in the measurement report information about its location. The MU can obtain this information in a plurality of ways, including GPS readings or other means. The location information sent by the MU can be used by the MART system to place the MU's location at the time of the coverage incident on a floor-map. Alternatively, if the MU omits the location information, the MART system can correlate the AP's unique identity information to locate and highlight the AP on a floor-map.

For 802.11k-only CHD-capable MUs: The MU will first report when it is in adequate coverage, and only after that will it report that it is experiencing poor coverage, whereupon its sends a measurement report including its beacon table and optionally the location information of the incident. All measurement requests sent by the AP are re-sent periodically (with an exponential back-off) to insure the MU has received it. The MU discards duplicate requests, which are harmless. The next request in the sequence is sent only after a report has been received. After receiving a measurement report, the cycle repeats.

When an AP receives a measurement report from an MU, it creates a coverage incident report and sends it to the Central Report Manager. There is no need for the AP to store any data, thus easing the burden on small-memory APs. When the Central Report Manager receives the coverage incident report, it updates a new coverage incident statistic for the indicated AP, logs an "event" (in the syslog) that can be seen by MART, and logs the incident data to the MART database. Subsequently, MART can be used to highlight a poor coverage area on a site floor plan map, and those APs for which coverage incidents have occurred.

Therefore, in one embodiment, the present invention provides an access point 104 for coverage hole detection in a wireless local area network (WLAN), comprising a processor 200 operable to store triggers for respective coverage measurement conditions, and a transceiver 202 coupled to the processor, the transceiver operable to download the triggers for respective coverage measurement conditions to at least one mobile communication device, receive in a Central Report Manager 102 a coverage incident report indicating a triggered coverage measurement condition detected by the at least one mobile communication device, and log the incident data to a Coverage Incident Reports Database 206 of MART 101 that stores Coverage Incident Reports, which can render this database visually on a display 208.

In more detail, the present invention can detect, report, and view coverage hole problems as follows. Firstly, at association, the MU and AP negotiate support for the coverage hole detection feature. If the feature is supported and enabled the AP sets into the MU a set of one or more Coverage Measurement Triggers, where each trigger (e.g. low RSSI, too many retries, etc.) detects a condition that may indicate poor or no coverage. When one of these trigger conditions is detected by the MU, the MU sends a Coverage Measurement Report to the AP to notify it of the unexpected coverage problem. These triggers and reports are facilitated using 802.11k capability plus some vendor-specific extensions. The AP receives the report(s) sent by the MU, optionally adds some data of its own, and creates a Coverage Incident Report. The AP sends the Coverage Incident Report to the Central Report Manager. The Central Report Manager receives Coverage Incident Reports from all of the APs. The Central Report Manager logs each report it receives to the Coverage Incident Report Database in MART. Using MART, the user can bring up a Site Floor Plan or map that shows the placement of the APs at a site and view any coverage holes that may have occurred at the site based on the data in the Coverage Incident Report Database.

MUs indicate their level of support for CHD through setting one or more information element bits that are exchanged with the AP in certain management frames. MUs that do not explicitly support CHD but that support a specific set of features of IEEE 802.11k—i.e. 802.11k-only CHD-capable MUs—should be able to participate in coverage hole detection but at a reduced level of functionality because they do not support the vendor-specific extensions that are relevant. The AP won't use any vendor-specific extensions when sending CHD-related measurement requests to these MUs.

The AP shall have the following new configuration parameters: Enable/Disable the Coverage Hole Detection feature, the poor-coverage trigger threshold value (ap_cfg_threshold), in dBm, at which the AP should request that the MU send it a Coverage Measurement Report (where an optimum value could be −70 dBm), an offset (ap_cfg_offset), in dBm, that is added to the trigger threshold value to determine a signal strength value that represents adequate coverage (where a typical value could be 5 dBm), and Enable/Disable the use of IEEE 802.11k-only CHD-capable MUs with the Coverage Hole Detection feature.

In overview, the MUs and APs interact in order to identify and report potential coverage hole problems as follows:

1. CHD-capable APs identify themselves and their specific capabilities to the MU through an existing vendor-specific information element (IE) in certain management frames. This existing capabilities IE appears in beacons and probe responses. The capabilities are reported in this IE as a set of bits. A new bit shall be added for Coverage Hole Detection in beacons and probe responses. The AP will set the Coverage Hole Detection bit in this IE only if Coverage Hole Detection has been enabled on the AP.
2. CHD-capable MUs shall include in (re)association request frames a new IE, MU Information, that specifies its Coverage Hole Detection support plus other various optional attributes about the MU, such as MU model and operating system, for use by the MART system. The AP can include the MU model and operating system in Coverage Incident Reports. The MART system can then use this information to analyze problems that might be generic to a specific MU model and operating system.
3. APs and clients shall also indicate their support for IEEE 802.11k in the standard way specified for that protocol (a bit in the Capabilities field and an IE with bit flags for each IEEE 802.11k feature, both of which appear in various management frames).
4. When an MU associates to an AP and both have advertised support for CHD, the AP shall configure the MU with a set of Coverage Measurement Triggers for respective coverage measurement conditions. The Coverage Measurement Triggers will take the form of an IEEE 802.11k Measurement Request, optionally with additional vendor-specific IEs to specify trigger types that are outside the scope of the IEEE 802.11k standard. The particular conditions of interest can include one or more of: AP's signal strength (RCPI or RSSI) falls below a certain threshold, optionally for a certain amount of time (where the certain amount of time allows the MU a chance to roam normally before sending the reports), excessive number of retries over some period of time or some percentage of packets, noise above a certain threshold for some period of time, unable to use higher data rates for some period of time or some percentage of packets, percentage of missed beacons above a certain threshold for a certain amount of time, the MU has a roam trigger but there are no other APs to roam to (where this could substitute for RSSI and missed beacons, and it has an advantage in that the MU, not the AP, decides that there is a problem based on its inability to roam), becomes disconnected for some minimum length of time, and some count of roam failures.
5. When the MU detects one of the trigger conditions specified in the Coverage Measurement Triggers, it will prepare a Coverage Measurement Report and send it to an AP. The Coverage Measurement Report shall take the form of one or more IEEE 802.11k Measurement Reports, optionally with some additional vendor-specific IEs to, for example, specify measurement results that are outside the scope of the IEEE 802.11k standard.
6. It is anticipated that 802.11k-only CHD-capable MUs can also participate in coverage hole detection, but in a more limited way than CHD-capable MUs. When a non-CHD-capable MU associates to a CHD-capable AP, the AP will restrict its actions to only the standard 11k functions accordingly.

7. When the AP receives a Coverage Measurement Report from an MU, it shall construct a Coverage Incident Report from the Coverage Measurement Report and send it via the wired connection to the Central Report Manager.
8. Since the serving AP may not be the AP to which the MU eventually sends the Coverage Measurement Report, the serving AP must make its information available to the MU before the MU forms the Coverage Measurement Report. The information about the serving AP is passed to the MU by the AP when the AP sends the MU the Coverage Measurement Triggers. The MU then copies this information into its Coverage Measurement Report.
9. The Central Report Manager shall log a coverage hole incident "event" to the syslog. This event will contain an identifier that marks the event as a coverage hole incident, the MU's MAC address, The AP's MAC address, and the AP BSSID to which the MU was associated. The Central Report Manager shall also log the coverage hole incident data to the MART Database. This data shall contain at a minimum: Type=coverage incident, date and time at which the incident occurred, MU MAC, AP MAC, AP BSSID, SSID, AP's radio index, the measured value that triggered the incident, the list of neighbor APs that were detected by the MU at the time of the incident, and the MU's location, if available.

For CHD-capable APs and MUs, the characterization of the triggers and measurement reports are implemented via the IEEE 802.11k standard plus some vendor-specific add-ons as follows:

1. It is not desired to burden the MU by asking it unnecessarily to take off-channel measurements, especially if the MU is trying to roam. To this end the Coverage Measurement Triggers only require the MU to monitor its home channel, and the Coverage Measurement Report only requires the MU to send back information it already has based on its own roam-scans, rather than requiring the MU to make new off-channel measurements.
2. It is not desired to have the MU generate and send a coverage measurement report if it can successfully roam without undue inefficiency or loss of communication.
3. It is only important to know the conditions at the MU when it first starts experiencing a coverage problem, and it is not important to know what happens over time to an MU after it has fallen out of good coverage and while coverage remains poor (which could last hours).
4. It is desired to maximize the chance that the MU will be able to successfully send a measurement report to an AP, which may be difficult when the MU experiences the circumstances specified in the Coverage Measurement Triggers.
5. When an MU detects a coverage problem, it is not desired to have the MU try to send a report to its serving AP right at that moment because coverage is not good enough to make it likely that the report will be received by the serving AP.
6. When an MU first associates to an AP, the MU may be moving from bad coverage to good coverage (e.g., walking into range after having been out of range). If the RCPI (Received Channel Power Indicator, similar to RSSI) observed by the MU for the AP is not above a threshold (−65 dBm for example), it is not desired that the MU do any of the following: try to send a saved coverage report that was generated when the MU was connected to its previous AP, since the report may not be received because coverage is not very good yet, or detect a coverage problem with the new AP (and generate a report), since it is only desired to detect and report a coverage problem after the MU has previously been in good coverage.
7. When detecting a RCPI trigger condition, it is desired for the MU to average the RCPI of the beacons it sees from its serving AP over some number of beacons. This will help eliminate false positives from a single beacon with an anomalous RCPI. It will also more closely reflect the algorithm that the MU uses for roaming.
8. If an MU becomes disconnected or roams to a different AP after it has started to form a Coverage Measurement Report (e.g., after it has detected RCPI<−70), it is desired that the MU save the report so that it can send it later once it comes into good coverage again.
9. When the MU comes into good coverage again and has a "saved report" to send, the MU may not be associated to the same AP for which it generated the information in the "saved report". The information contained in the report must allow the new AP that receives the report to form a Coverage Incident Report using the information from the original AP.
10. In many WLAN implementations, neither the MU nor the AP knows at an appropriate layer in the WLAN network stack whether a frame it has sent was received by the other end (i.e., has been 802.11-ACKed by the other end). The frames and algorithms below take that into account by doing the ACK at a higher layer (i.e., by using a "layer-3 ACK").
11. The measurement requests have been engineered in such a way that the MU will always be in reasonable coverage when it attempts to send a report. This maximizes the chances that the report will be received by the AP.
12. One goal of the way in which the vendor-specific elements have been designed is to alleviate the need for the MU to keep much state information about the CHD process. The MU need only follow the instructions indicated by the vendor-specific elements without having to know about the bigger CHD picture.

Expected behavior of CHD-capable MUs:

1. The MU is capable of performing all of the measurement requests specified in the AP's measurement request action frame before sending a measurement report Action frame to the AP.
2. The MU is capable of sending only a single (not multiple) measurement report Action frame with the results of the Measurement Request.
3. When the MU detects the poor-coverage trigger condition of, for example, RCPI<−70 as specified in the Measurement Request, The MU's scan table will contain the results of a recent scan performed for the purposes of roaming, and that the MU will build the requested beacon table report from its scan table.
4. It is desired that the beacon table report returned by the MU contain information about the current AP's neighbors. This assumes that the MU knows what channels to scan in order to find its current AP's neighbors. The IEEE 802.11k Neighbor Request/Report will be used to query the AP for its neighbors.

Note that the Coverage Measurement Triggers are independent of any roaming thresholds internal to the MU. The idea behind the Coverage Measurement Triggers is to get the MU to report why it can't roam, not to tell the MU how to decide when to roam.

In operation, the triggers and measurement frames exchanged by the AP and a CHD-capable MU are all IEEE 802.11k radio measurement Action frames, but with some vendor-specific extensions. For ease of discussion, the RCPI trigger values in the description below are given as hard coded values; however, they are actually derived from the AP's configuration parameters. The frame exchange operates as follows:

1. When the MU is in the "ready" state (i.e., after association, IEEE 802.1X authentication, and the key exchange), the AP sends the MU a Measurement Request 1, which contains: a passive beacon request on the home channel for BSSID=current AP, with a reporting condition of RCPI>−65 dBm. The purpose of Measurement Request 1 is for the MU to let the AP know when it is in good enough coverage to be reasonably sure of reliable communication.
2. When the good coverage reporting condition is met in the MU, the MU sends Measurement Report 1 to the AP indicating that the RCPI is above the threshold. Piggy-backed onto this report is any "saved report" that the MU may have. The MU will have a "saved report" if it was previously in the middle of performing Measurement Request 2 when it became disconnected or roamed to its current AP. The purpose of Measurement Report 1 is to let the AP know that the MU is in reasonable coverage and to send any "saved report" while in reasonable coverage.
3. Upon receiving Measurement Report 1, the AP will send Measurement Request 2, which contains the following measurement request IEs in the order shown: 1E2.1—a passive beacon request on the home channel for BSSID=current AP with a reporting condition of RCPI<−70 dBm, IE2.2—a beacon table request (for SSID=current SSID, BSSID=wildcard), IE2.3—a Location Configuration Information (LCI) location request for the MU's current location, and IE2.4—a passive beacon request on the home channel for BSSID=current AP, with a reporting condition of RCPI>−65 dBm.
4. The MU executes each request IE in Measurement Request 2 in sequential order and does not send any IEEE 802.11k measurement report frames until the requested sequence of measurements is completed. For 1E2.1, the MU waits (i.e., "blocks" on this IE) until the AP's signal strength is <−70 and forms a measurement report IE that includes the observed RCPI at the trigger time. This is the trigger that indicates that the MU is having a coverage problem. For IE2.2, the MU forms multiple measurement report IEs that contain the requested beacon table information. This should cause the MU to return its current scan table, which should already contain the neighbor APs and their signal strength as observed by the MU. It is assumed that the MU will already have very recently performed a scan for the purposes of roaming and that its table will reflect that. This information should help indicate why the MU has not already roamed. For IE2.3, the MU forms an LCI IE with its current location (e.g. essentially the latitude, longitude, and altitude). This information should help indicate where the coverage hole is located. For IE2.4, the MU waits (i.e., "blocks" on this IE) until the AP's signal strength is >−65 and forms a measurement report IE that includes the observed RCPI at the trigger time. This is the trigger that indicates that the MU is back in good coverage, and so can send a measurement report back to the AP with some confidence that the report will be received. Once the sequence of measurements above is completed, the MU takes the report IEs that it formed for those measurements, creates Measurement Report 2 from them, and sends them to the AP.
5. Measurement Request 2 has a "repeat count" of 65535 (which mean "infinite repeats"). This instructs the MU to repeat the sequence of measurements and send reports forever, or until the MU becomes disconnected or roams.
6. Measurement Request 1 also has a "repeat count" of 65535. This instructs the MU to repeat the (single) measurement IE over and over until the reporting condition is met, at which time the MU will send Measurement Report 1. When the MU sends Measurement Report 1 to the AP, the AP will send Measurement Request 2. As per the 802.11k specification, Measurement Request 2 should replace Measurement Request 1 in the MU.

In particular, in order to implement CHD in a more robust way than is supported by IEEE 802.11k, the action frames in CHD Frame Dialog include:

Measurement Request 1: Category=radio measurement, Action=radio measurement request, Dialog Token=1, Repeat count=65535 (i.e., do it forever), Vendor-specific IE: RM CHD-Related Request, Vendor-specific IE: RM CHD Send Saved Report, Measurement Request IE (IEEE 802.11k section 7.3.2.21): (i) measurement token, (ii) mode: (parallel=0, enable=0, request=0, report=0, duration mandatory=0), (iii) measurement type=beacon request (IEEE 802.11k section 7.3.2.21.6), (iv) measurement request: 1. regulatory class=AP's regulatory class, 2. channel number=AP's home channel, 3. randomization=0, 4. duration=1000, 5. Mode=passive, 6. BSSID=AP's BSSID, and Subelement: beacon reporting information: a) reporting condition=1 (RCPI> threshold), b) threshold/offset=ap_cfg_threshold+ap_cfg_offset (typically −65 dBm), and Subelement: reporting detail: level=0 (no fixed length fields or IEs), and Subelement: vendor-specific: RM CHD Instructions: a) Use Average, b) Blocking Request.

Measurement Request 1 ACK: Category=radio measurement, Action=radio measurement report, Dialog Token= (value from measurement request 1), Vendor-specific IE: RM CHD ACK.

Measurement Report 1: Category=radio measurement, Action=radio measurement report, Dialog Token=(value from measurement request 1), Measurement Report IE (IEEE 802.11k section 7.3.2.22): (i) measurement token, (ii) mode: (ok, late, incapable, refused), (iii) measurement type=beacon report (IEEE 802.11k section 7.3.2.22.6), (iv) measurement report: 1. regulatory class=serving AP's regulatory class, 2. channel number=serving AP's home channel, 3. actual start time, 4. actual duration, 5. reported frame information (PHY type, frame type=beacon, probe response, measurement pilot), 6. RCPI, 7. RSNI, 8. BSSID=serving AP's BSSID, 9. Antenna ID, 10. Parent TSF, and Vendor-specific IE: RM CHD Saved Report Follows (optional; if present, then . . . ), Additional IEs for the "saved report" (contains all IEs in measurement report 2).

Measurement Report 1 ACK: Category=radio measurement, Action=radio measurement request, Dialog Token= (value from measurement report 1), Vendor Specific IE: RM CHD ACK.

Measurement Request 2: Category=radio measurement, Action=radio measurement request, Dialog Token=2, Repeat count=65535 (i.e., forever), Vendor-specific IE: RM CHD-Related-Request, Vendor-specific IE: RM Copy Next, Vendor-specific IE: RM CHD AP Info, Vendor-specific IE: RM CHD Send MU Info, Measurement Request IE (IEEE 802.11k section 7.3.2.21): (i) measurement token, (ii) mode: (parallel=0, enable=0, request=0, report=0, duration mandatory=0), (iii) measurement type=beacon request (IEEE 802.11k section 7.3.2.21.6), (iv) measurement request: 1. regulatory class=AP's regulatory class, 2. channel number=AP's home channel, 3. randomization=0, 4. duration=1000, 5. Mode=passive, 6. BSSID=AP's BSSID, 7. Subelement: beacon reporting information: (a) reporting condition=2 (RCPI<threshold), (b) threshold/offset=ap_cfg_threshold (typically −70 dBm), Subelement: reporting detail: level=0 (no fixed length fields or IEs), and Subelement: vendor-specific: RM CHD Instructions, a) Use Average, b) Save Report, c) Blocking Request, Measurement Request IE (IEEE 802.11k section 7.3.2.21): (i) measurement token, (ii) mode: (parallel=0, enable=0, request=0, report=0, duration mandatory=0), (iii) measurement type=beacon (table) request (IEEE 802.11k section 7.3.2.21.6), (iv) measurement request: 1. regulatory class=AP's regulatory class (ignored by MU), 2. channel number=AP's home channel (ignored by MU), 3. randomization=0 (ignored by MU), 4. duration=0 (ignored by MU), 5. Mode=2: beacon table, 6. BSSID=wildcard BSSID, 7. Subelement: SSID: SSID=SSID that MU has associated to, and Subelement: reporting detail: level=0 (no fixed length fields or IEs), Measurement Request IE (IEEE 802.11k section 7.3.2.21): (i) measurement token, (ii) mode: (parallel=0, enable=0, request=0, report=0, duration mandatory=0), (iii) measurement type=LCI (location) (IEEE 802.11k section 7.3.2.21.9), (iv) measurement request: 1. local/remote=remote (i.e., location of the MU), 2. latitude requested resolution, 3. longitude requested resolution, 4. altitude requested resolution, 5. Subelement: vendor-specific request to have the MU tell its estimated accuracy of its reported position, Measurement Request IE (IEEE 802.11k section 7.3.2.21): (i) measurement token, (ii) mode: (parallel=0, enable=0, request=0, report=0, duration mandatory=0), (iii) measurement type=beacon request (IEEE 802.11k section 7.3.2.21.6), (iv) measurement request: 1. regulatory class=AP's regulatory class, 2. channel number=AP's home channel, 3. randomization=0, 4. duration=1000, 5. Mode=passive, 6. BSSID=AP's BSSID, 7. Subelement: beacon reporting information: a) reporting condition=1 (RCPI> threshold), b) threshold/offset=ap_cfg_threshold+ap_cfg_offset (typically −65 dBm), Subelement: reporting detail: level=0 (no fixed length fields or IEs), and Subelement: vendor-specific: RM CHD Instructions: a) Use Average, b) Blocking Request.

Measurement Request 2 ACK: Category=radio measurement, Action=radio measurement report, Dialog Token= (value from measurement request 2), IE: RM CHD ACK.

Measurement Report 2 (can be sent multiple times because of repeat count in request): Category=radio measurement, Action=radio measurement report, Dialog Token= (value from measurement request 2), Vendor-specific IE: RM CHD AP Info, Vendor-specific IE: RM CHD MU Info, Measurement Report IE (IEEE 802.11k section 7.3.2.22): (i) measurement token, (ii) mode: (ok, late, incapable, refused), (iii) measurement type=beacon report (IEEE 802.11k section 7.3.2.22.6), (iv) measurement report: 1. regulatory class=serving AP's regulatory class, 2. channel number=serving AP's home channel, 3. actual start time, 4. actual duration, 5. reported frame information (PHY type, frame type=beacon, probe response, measurement pilot), 6. RCPI, 7. RSNI, 8. BSSID=serving AP's BSSID, 9. Antenna ID, 10. Parent TSF, For each AP in MU's scan table with requested SSID: Measurement Report IE (IEEE 802.11k section 7.3.2.22): (i) measurement token, (ii) mode: (ok, late, incapable, refused), (iii) measurement type=beacon (table) report (IEEE 802.11k section 7.3.2.22.6), (iv) measurement report: 1. regulatory class, 2. channel number, 3. actual start time, 4. actual duration, 5. reported frame information (PHY type, frame type=beacon, probe response, measurement pilot), 6. RCPI, 7. RSNI, 8. BSSID, 9. Antenna ID, 10. Parent TSF, Measurement Report IE (IEEE 802.11k section 7.3.2.22): (i) measurement token, (ii) mode: (ok, late, incapable, refused), (iii) measurement type=LCI (location) (IEEE 802.11k section 7.3.2.21.9), (iv) measurement report: 1. Latitude: resolution, fraction, integer, 2. Longitude: resolution, fraction, integer, 3. Altitude: type, resolution, fraction, integer, 4. Datum, 5. Subelement: vendor-specific where MU estimates the accuracy of its reported position, Measurement Report IE (IEEE 802.11k section 7.3.2.22): (i) measurement token, (ii) mode: (ok, late, incapable, refused), (iii) measurement type=beacon report (IEEE 802.11k section 7.3.2.22.6), (iv) measurement report: 1. regulatory class=serving AP's regulatory class, 2. channel number=serving AP's home channel, 3. actual start time, 4. actual duration, 5. reported frame information (PHY type, frame type=beacon, probe response, measurement pilot), 6. RCPI, 7. RSNI, 8. BSSID=serving AP's BSSID, 9. Antenna ID, 10. Parent TSF.

Measurement Report 2 ACK: Category=radio measurement, Action=radio measurement request, Dialog Token= (value from measurement report 2), IE: RM CHD ACK.

If the AP receives a frame from the MU that is malformed, the AP may decide to terminate the CHD measurements by sending a "canceling request". This canceling request will consist of an empty beacon measurement request. As per the 11k spec, the MU should, in response, cancel any outstanding measurement request. The MU should not send a report in response to the canceling measurement request. The AP will also include a RM CHD-Related Request IE as part of the canceling request. This instructs the MU that it should send back a layer-3 ACK to acknowledge receipt of the canceling request. The frame sequence will be as follows: Canceling Request: Category=radio measurement, Action=radio measurement request, Dialog Token=3, Repeat count=0, IE: Vendor-specific IE: RM CHD-Related Request, Vendor-specific IE: RM CHD Send Saved Report, and contains no Measurement Request IE.

Canceling Request ACK: Category=radio measurement, Action=radio measurement report, Dialog Token=(value from canceling request), Vendor-specific IE: RM CHD ACK.

In summary, the AP relies on the CHD-capable MU to perform various non-IEEE 802.11k-standard functions in support of coverage hole detection. To that end, the IEEE 802.11k frame exchange incorporates vendor-specific IEs and subelements. Vendor-specific IEs appear in measurement request Action frames at the same level as measurement request IEs and similarly for measurement report Action frames. The subelements are placed inside the IEs. The following vendor-specific IEs will be created for use with coverage hole detection:

IE Name: RM CHD-Related Request indicates that the measurement request in which this IE appears is related to CHD and the MU should perform any necessary non-11k-standard functions not explicitly specified by other IEs and subelements. Purpose: identifies the measurement request Action frame that this IE appears in as being part of the coverage hole detection feature. The MU keys off of this subelement to trigger vendor-specific behavior in processing the measurement request. Appears in: CHD-related measurement request Action frames sent from the AP to a CHD-capable MU. Content: a) ID=221, uint8, b) length=6, uint8, c) OUI=00-A0-F8, uint8[3], d) Type=RM, uint8, e) Subtype=1, uint8, f) Version=1, uint8.

IE Name: RM CHD ACK used in both requests and reports for performing a layer-3 ACK of a measurement request/report Action frame. Purpose: Acknowledges the receipt of a radio measurement request or report Action frame. An ACK frame is necessary because neither the APs nor the MUs typically retain the information of whether an 802.11 ACK was received for a sent frame. Appears in: CHD-related measurement request and report Action frames sent between the AP and a CHD-capable MU. The Action frame being ACKed in this way is identified by its dialog token, which is repeated in the Action frame that contains this IE. Content: a) ID=221, uint8, b) length=6, uint8, c) OUI=00-A0-F8, uint8[3], d) Type=RM, uint8, e) Subtype=2, uint8, f) Version=1, uint8.

IE Name: RM Copy Next instructs the MU to copy the next 'n' IEs to its report. Purpose: indicates to the MU that it should copy the next 'n' IEs to any measurement report Action frame that is generated for the measurement request Action frame in which this IE appears. Appears in: CHD-related measurement request Action frames sent from the AP to a CHD-capable MU. Content: a) ID=221, uint8, b) length=7, uint8, c) OUI=00-A0-F8, uint8[3], d) Type=RM, uint8, e) Subtype=3, uint8, f) Version=1, uint8, g) IE copy count='n', uint8.

IE Name: RM CHD AP Info contains information about the AP. When present in a measurement request, it is always preceded by a RM Copy Next IE. When present in a measurement report, the IE has been copied from the request. Purpose: Contains information about the AP issuing the measurement request Action frame in which this IE appears. Always preceded by a "RM Copy Next" when it appears in a measurement request. Appears in: CHD-related measurement requests and report Action frames sent between the AP and a CHD-capable MU. Content: a) ID=221, uint8, b) length=variable, uint8, c) OUI=00-A0-F8, uint8[3], d) Type=RM, uint8, e) Subtype=4, uint8, f) Version=1, uint8, g) AP's unix epoch time at time of request, uint32, little-endian in frame data, h) AP MAC, uint8[6], i) BSSID, uint8[6], j) AP's CHD threshold (ap cfg threshold), int8, k) AP's CHD offset (ap_cfg_offset), uint8, l) regulatory class, uint8, m) channel number, uint8, n) radio index (1 based), uint8, o) SSID length, uint8, p) SSID, uint8[SSID length], q) Neighbor AP list (zero or more, according to "length", of): (i) BSSID, uint8[6], (ii) Regulatory class, uint8, (iii) Channel number, uint8. Notes: The AP MAC should be the MAC address used to identify the AP in MART. The radio index shall be 1-based to match the AP CLI usage. This IE should be transparent to the MU since all it does is copy it.

IE Name: RM CHD Send Saved Report where the AP is requesting that the MU include any "saved report" that it has in the report corresponding to the request in which this IE appears. Purpose: indicates to the MU that it should send any "saved report" along with the report that the MU generates when it completes the measurement request(s) in the Action frame in which this IE appears. Appears in: CHD-related measurement requests sent from the AP to a CHD-capable MU. Content: a) ID=221, uint8, b) length=6, uint8, c) OUI=00-A0-F8, uint8[3], d) Type=RM, uint8, e) Subtype=5, uint8, f) Version=1, uint8.

IE Name: RM CHD Saved Report Follows where when the MU has a "saved report" to send, the MU includes this IE (and the "saved report") in the measurement report corresponding to a request with the RM CHD Send Saved Report IE. Purpose: indicates to the AP that all IEs that follow this IE represent a "saved report". The AP should extract the "saved report", form a Coverage Incident report, and send it to the Central Report Manager. Appears in: CHD-related measurement report Action frames sent from a CHD-capable MU to the AP. Content: a) ID=221, uint8, b) length=6, uint8, c) OUI=00-A0-F8, uint8[3], d) Type=RM, uint8, e) Subtype=6, uint8, f) Version=1, uint8.

IE Name: RM CHD Send MU Info where the AP is requesting that the MU send its information in the report that corresponds to the request in which this IE appears. Purpose: indicates to the MU that it should send its MU Info in the measurement report Action frame generated as a result of performing the requested measurements in the Action frame in which this IE appears. The MU should fulfill this by including a "RM CHD MU Info" IE in the measurement report Action frame. Appears in: CHD-related measurement requests sent from the AP to a CHD-capable MU. Content: a) ID=221, uint8, b) length=6, uint8, c) OUI=00-A0-F8, uint8[3], d) Type=RM, uint8, e) Subtype=7, uint8, f) Version=1, uint8.

IE Name: RM CHD MU Info contains information about the MU. The MU places this IE in a measurement report that corresponds to a measurement request that contains the RM CHD Send MU Info IE. Purpose: Contains information about the MU issuing the measurement report Action frame in which this IE appears. Appears in: CHD-related measurement reports sent from a CHD-capable MU to the AP. Content: a) a triggering measurement type and triggering value are for future use. For now triggering measurement type should be set to 1 (to indicate RCPI) and triggering value should be set to the same value of RCPI reported by the MU in the measurement report IE, b) epoch times are set to tv.tv_sec from gettimeofday(&tv, NULL), c) the report id must be unique and monotonically increasing, d) RCPI (in u8val[0]) should be encoded as per the IEEE 802.11k specification, e) All multi-byte values should be placed in frame data in little-endian order, e) The same Optional subelements may appear as for MU Information IE.

Vendor-specific subelements appear in measurement request Action frames inside of measurement request IEs and similarly for measurement report Action frames:

Subelement Name: RM CHD Instructions: Purpose: indicates to the MU that it should follow various instructions when carrying out the measurement in which this subelement appears. Each of the various instructions is enabled/disabled by a bit in a bit field. Appears in: CHD-related beacon measurement request IEs. Content: a) ID=221, uint8, b) length=6, uint8, c) OUI=00-A0-F8, uint8[3], d) Type=RM, uint8, e) Subtype=9, uint8, f) Version=1, uint8, g) Byte1: (i) Bit0: Use Average: the AP is requesting that the MU use an average value instead of an instantaneous value of RCPI, calculated over the duration specified in the enclosing request IE, for determining whether the specified reporting condition has been met, (ii) Bit1: Save Report: the AP is requesting that, once the MU completes the measurement request IE in which this subelement appears, the MU should add all IEs generated for the entire measurement request Action frame in which this subelement appears to the MU's "saved report". In other words, once the measurement in which this subelement appears has been completed, the results are worth saving, even if they are incomplete, so that if the MU becomes disconnected or roams, the (possibly partial) results can be reported later when the MU reconnects, (iii) Bit3: Blocking Request: the AP is requesting that the MU "block" on the enclosing request IE until the IE's reporting condition is met. This is used in all of the passive home channel beacon measurement requests in both Measurement Requests 1 and 2 (though strictly speaking, it is not needed in request 1), and h) Byte2=reserved.

For Incident Report Management, the Central Report Manager is implemented on the RF Domain Controller. The APs will send Incident Reports to the Central Report Manager, which will log events for the incidents. The existing mechanisms and formats will be used for handling these events. This event is a text string that describes the incident. The event can be directed to one or more outputs including the syslog. Since an Incident Report is an "event", as opposed to a "statistic", the data for the report need not be stored locally on the AP after it has been sent to the Central Report Manager. When the Central Report Manager receives Incident Reports from the APs, it also logs them to the Incident Report Database. The Central Report Manager will keep Coverage Incident statistics as follows: the Central Report Manager will maintain a new per-AP statistic that counts the number of Coverage Incident Reports received against each AP, and the user can view this new statistic using the CLI command "show wireless AP detail". It is anticipated that the Coverage Incident statistics may be useful on small deployments in which MART is not available.

The Coverage Incident data collected in the Coverage Incident Report Database (i.e. MART Database) can be analyzed manually using the MART display as a visualization aid. It is advantageous to offer one or more of: an analysis daemon that wakes up every so often, performs an analysis of the new entries in the coverage incident report database, and sends an alarm to an administrator if there appears to be a problem, and an "expert" mode or command in MART in which it analyzes the incidents for a user-specified site for a user-specified time period and generates a report of trouble spots along with proposed remedial actions. (For those non-MART deployments a user will be able to: view a simple count of Coverage Incidents on a per-AP basis using the CLI command "show wireless AP detail" on the machine hosting the Central Report Manager, and view a list of Coverage Incident "events" in the syslog in much the same way other events are currently shown.)

The syslog "event" that is generated by the Central Report Manager will be as follows: <date and time> <hostname> <subsystem> COVERAGE_HOLE_INCIDENT Client '<mac>' reported coverage hole incident for Bssid '<bssid>' on AP '<apmac>. Where: <date and time> are the date and time at which the Coverage Incident Report was sent, <hostname> is the hostname of the machine running the Central Report Manager that received the Coverage Incident Report, <apmac> is the MAC of the AP with which the MU had the coverage problem (NOT the AP hostname of the AP that received the Coverage Measurement Report), <subsystem> would be "DOT11", <mac> is the MU MAC, and <bssid> is the BSSID to which the MU was associated.

In MART deployments, in addition to viewing the statistics and logs as described in the section above, the user will also be able to use MART to help in visualizing Coverage Incident occurrences. It is anticipated that MART will use a "Mapview Control" for displaying Coverage Incidents. The MART can function to: display a list of the sites, by RF-domain-name, that have had more than a user-specified number and type of incident reports within a user-specified time period, save user-specified preferences for which data to view/filter, on a per-site basis, provide an "expert" mode in which MART analyzes the incidents for a user-specified site for a user-specified time period and generates a report of trouble spots along with proposed remedial actions, highlight (e.g., mark in red) all APs that have had more than a user-specified number and type of incidents within a user-specified time period, highlight all APs that have had more than a user-specified number and type of incidents within a user-specified time period involving a specific MU (or list of MUs), allow the user to select an AP in order to view more detail about the incidents involving that AP, and provide details that include: general AP information (AP identifier, model, firmware, etc.), and a sortable list of incidents for the AP where each incident in the list includes incident type, occurrence date and time, MU identifier, trigger type for coverage incidents, and where the user can select an item in the list to "drill down", perhaps through several additional levels, and eventually get all of the information included in the Incident Report. Coverage incident-specific functions include: allow the user to exclude certain classes of coverage incidents (probably by initial trigger type) from being considered/displayed, for one or more user-selected APs, draw on the floor plan a representation of the location of the MUs that reported user-selectable types of incidents against those APs. Using an "X" or an enclosing shape (e.g., circle or box), and allow the user to exclude from consideration/display those user-specified types of incidents for which one or more user-specified MUs were located within a user-specified area indicated, say, by a user-drawn box.

Figure 3:
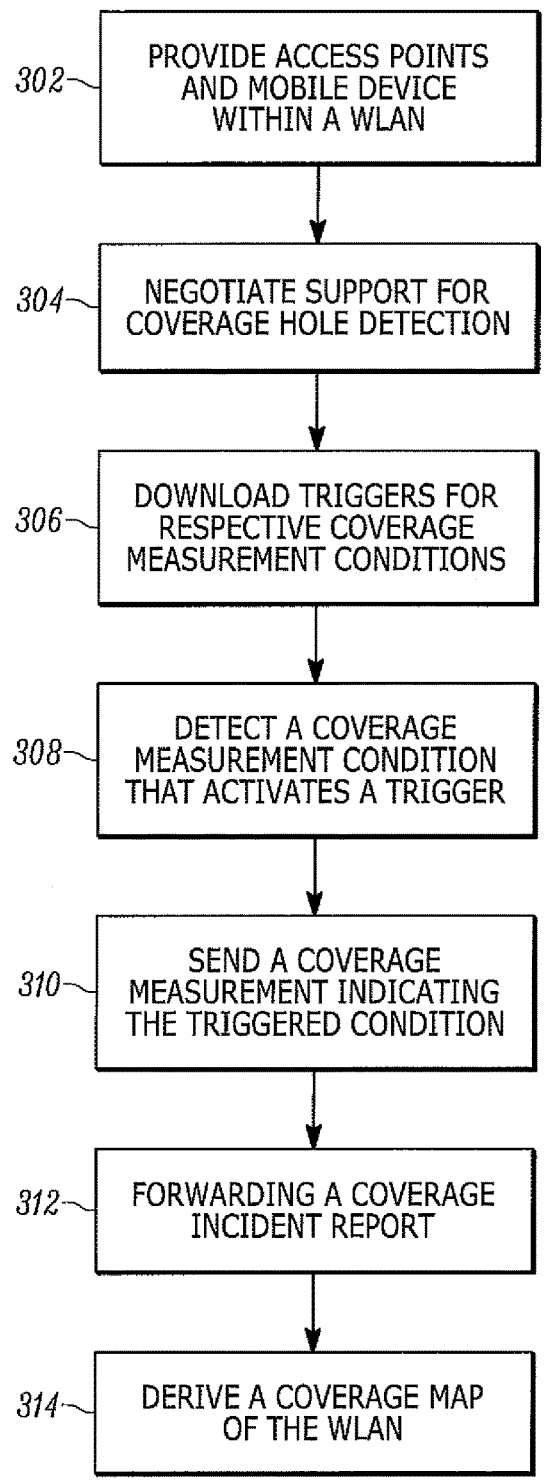
FIG. 3 is a flow diagram of a method, in accordance with some embodiments of the present invention.

FIG. 3 presents a flow chart that illustrates a method 300 for coverage hole detection in a wireless local area network (WLAN) using a mobile communication device, according to an exemplary embodiment of the present invention.

A first step 302 includes providing a plurality of access points (APs) distributed within the WLAN and at least one mobile communication device or unit (MU) operable within the WLAN.

A next step 304 includes negotiating support for coverage hole detection between the one of the plurality of APs and the associated mobile communication device. During negotiation, the mobile communication devices indicate to the access point its type of support for coverage hole detection. In particular, the mobile communication devices can include an information element in association request frames that specify support for coverage hole detection. In addition, the mobile communication devices include an information element in a management frame indicating support for IEEE 802.11k protocols, wherein the mobile communication device and associated AP advertise their support for coverage hole detection, and wherein the triggers take the form of an IEEE 802.11k measurement request, and wherein the report takes the form of an IEEE 802.11k measurement report.

A next step 306 includes downloading triggers for respective coverage measurement conditions to the at least one associated mobile communication device from an associated AP. Those mobile communication devices pre-configured to support coverage hole detection are downloaded different triggers than mobile communication devices that are not pre-configured to support coverage hole detection. The triggers for respective coverage measurement conditions include at least one of the group of: a measured received signal strength indication or a received channel power indicator of a management frame (e.g. beacon) below a first threshold, a number of retries above a second threshold, noise above a third threshold for a predetermined period of time, limited ability to increase data rate, percentage of missed beacons, inability to roam, a predetermined count of roam failures, and disconnection. The triggers require the at least one mobile unit only to monitor its home channel, and the coverage measurement only requires that the at least one mobile communication device send back measurements it already has based on its own roaming scans.

A next step 308 includes detecting a coverage measurement condition by the at least one mobile communication device that activates one of the triggers. In one embodiment, the mobile communication device takes an average of a number of coverage measurement conditions and detects when the average activates the trigger. The trigger can involve measuring not only beacons but other types of frames. The triggers cover measurement conditions for both received and transmitted frames, for both management and data frames, and for both broadcast and unicast frames.

Whereupon a next step 310 includes sending a coverage measurement indicating the triggered condition from the at least one mobile communication device to an associated AP. Where there is no present coverage, the mobile communication device will save the coverage measurement and send it to a next AP it associates with when there are no longer any active triggers, indicating a good coverage area. The at least one mobile communication device will not send a coverage measurement until it has first encountered a good coverage area.

A next step 312 includes forwarding a coverage incident report to the Central Report Manager, wherein the AP creates the coverage incident report comprising the coverage measurement, an identity of the AP to which the MU was associated when the incident was triggered, and optionally a location of the coverage measurement.

A next step 314 includes deriving a coverage map of the WLAN using multiple coverage incident reports in order to indicate APs and coverage holes.

Advantageously, the solution described herein provides an effective technique to detect coverage holes in real-time using existing equipment. The mobile unit only monitors its home channel, and is only required to send back information it already has based on its own roam-scans, rather than being requiring to make new measurements. In this way, there is no need for the mobile unit to generate and send a coverage report if it can successfully roam, without undue inefficiency or loss of communication.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for coverage hole detection in a wireless local area network (WLAN) using at least one mobile communication device, the method comprising:
   downloading triggers for coverage measurement conditions to the at least one mobile communication device from at least one of a plurality of access points;
      detecting a coverage measurement condition by the at least one mobile communication device that activates one of the triggers; and
      sending a coverage measurement indicating the triggered coverage measurement condition from the at least one mobile communication device to the at least one of the plurality of access points, wherein the at least one of the plurality of access points forwards a coverage incident report to a Central Report Manager,
   wherein the at least one mobile communication device indicates to the at least one of the plurality of access points its type of support for coverage hole detection.

2. The method of claim 1, wherein in the downloading and sending steps, those mobile communication devices pre-configured to support coverage hole detection are downloaded different triggers than mobile communication devices that are not pre-configured to support coverage hole detection.

3. The method of claim 1, wherein the at least one mobile communication device includes an information element in association request frames that specify support for coverage hole detection.

4. The method of claim 1, wherein the at least one mobile communication device includes an information element in a management frame indicating support for IEEE 802.11k protocols, and wherein the at least one mobile communication device and the at least one of the plurality of access points advertise their support for coverage hole detection, wherein the triggers take the form of an IEEE 802.11k measurement request, and wherein the report takes the form of an IEEE 802.11k measurement report.

5. The method of claim 1, wherein the coverage incident report includes the coverage measurement and an identity of the at least one of the plurality of access points to which the at least one mobile communication device was associated when the incident was triggered.

6. The method of claim 1, wherein the triggers for respective coverage measurement conditions include at least one of the group of: a measured received signal strength indication or a received channel power indicator of a management frame below a first threshold, a number of retries above a second threshold, noise above a third threshold for a predetermined period of time, limited ability to increase data rate, percentage of missed beacons, inability to roam, a predetermined count of roam failures, and disconnection.

7. The method of claim 1, further comprising the step of deriving a coverage map of the WLAN using multiple coverage incident reports.

8. The method of claim 1, wherein the triggers require the at least one mobile communication device to monitor its home channel, and the measurement report requires that the at least one mobile communication device send back measurements it already has based on its own roaming scans.

9. The method of claim 1, wherein in the sending step, the at least one mobile communication device saves the coverage measurement and sends the coverage measurement to the at least one of the plurality of access points when there are no longer any active triggers, indicating a good coverage area.

10. The method of claim 1, wherein in the detecting step, the at least one mobile communication device takes an average of a number of coverage measurement conditions and detects when the average activates the trigger.

11. The method of claim 1, wherein in the sending step, the at least one mobile communication device sends a coverage measurement after it has first encountered a good coverage area.

12. The method of claim 1 wherein the at least one mobile communication device and the at least one of the plurality of access points exchange message frames that include a WLAN association request frame configured to specify support for coverage hole detection.

13. The method of claim 1 wherein the at least one mobile communication device and the at least one of the plurality of access points exchange message frames that include a WLAN management frame configured to advertise support for coverage hole detection.

14. The method of claim 13 wherein the WLAN management frame is an IEEE 802.11k protocol management frame.

15. An access point for coverage hole detection in a wireless local area network (WLAN), comprising:
   a processor operable to store triggers for respective coverage measurement conditions; and
   a transceiver coupled to the processor, the transceiver operable to:
      download the triggers for respective coverage measurement conditions to at least one mobile communication device,
      receive a coverage measurement indicating a triggered coverage measurement condition detected by the at least one mobile communication device, and
      send a coverage incident report to a Central Report Manager,
         wherein the at least one mobile communication device and the access point exchange message frames that are configured to indicate support for coverage hole detection, the message frames including at least one of an association request frame and a management frame.

16. A system for coverage hole detection in a wireless local area network (WLAN), comprising:
   a Central Report Manager;
   a plurality of access points distributed within the WLAN; and
   at least one mobile communication device operable within the WLAN, and operable to:
      download triggers for respective coverage measurement conditions from at least one of the plurality of access points associated with the at least one mobile communication device, detect a coverage measurement condition that activates one of the triggers, and send a coverage measurement indicating the triggered condition to the at least one of the plurality of access points, which forwards a coverage incident report to the Central Report Manager, wherein the at least one mobile communication device and the at least one of the plurality of access points exchange message frames that are configured to indicate support for coverage hole detection, the message frames including at least one of an association request frame and a management frame.

17. A method for coverage hole detection in a wireless local area network (WLAN) using at least one mobile communication device, the method comprising:

downloading triggers for coverage measurement conditions to the at least one mobile communication device from at least one of a plurality of access points;

detecting a coverage measurement condition by the at least one mobile communication device that activates one of the triggers; and sending a coverage measurement indicating the triggered coverage measurement condition from the at least one mobile communication device to the at least one of the plurality of access points, wherein the at least one of the plurality of access points forwards a coverage incident report to a Central Report Manager, wherein in the downloading and sending steps, mobile communication devices that are pre-configured to support coverage hole detection are downloaded different triggers from mobile communication devices that are not pre-configured to support coverage hole detection.

* * * * *